United States Patent Office

3,826,710
Patented July 30, 1974

3,826,710
CARBONATION SYSTEM FOR RECOVERY OF SODIUM BASE PULPING LIQUOR
Clyde G. Anderson, Cincinnati, Ohio, assignor to Owens-Illinois, Inc.
Filed Apr. 21, 1972, Ser. No. 246,366
Int. Cl. D21c *11/02, 11/06*
U.S. Cl. 162—36                                    2 Claims

ABSTRACT OF THE DISCLOSURE

This invention provides an integrated closed carbonation system for recovering sodium base sulfite pulping liquor which is of interest chemically, thermally and ecologically. The system includes in combination (1) smelt solutions containing from 33 to 67 mol percent sodium sulfide with the balance primarily sodium carbonate, (2) self-sufficiency in carbon dioxide for displacement of the sulfide, (3) temperatures during carbonation of from 140°–180° F., (4) an intermediate concentration of $CO_2$ for carbonation, (5) systems for cycling various gas streams to conserve and reuse carbon dioxide while still purging the system of nitrogen and in particular the recycling of purge gases from a precarbonation zone to a main carbonation zone, (6) production of gases containing $H_2S$ at a concentration greater than 6% by volume suitable for direct combustion to $SO_2$, and (7) purge gases essentially free of either $H_2S$ or $SO_2$.

BACKGROUND OF THE INVENTION

There are several known methods based on the combustion of a spent sodium base sulfite liquor in a reductive recovery furnace to produce an inorganic smelt containing sodium sulfide and sodium carbonate. In the more common of these, this smelt is treated with water and carbon dioxide to remove the sulfur as hydrogen sulfide and form a carbonate. Thereafter, the $H_2S$ is oxidized to $SO_2$ which is combined with the sodium carbonate to reconstitute the sodium sulfite for reuse in a pulping liquor.

The Stora process as it is known today, is characterized by (1) countercurrent treatment of a clarified smelt solution containing sodium carbonate and sodium sulfide at elevated temperatures in a plate column with essentially pure carbon dioxide to drive off a mixture of carbon dioxide and hydrogen sulfide and to form a solution of sodium bicarbonate and sodium carbonate, (2) the reaction of this solution with a solution of sodium bisulfite in the so-called decarbonation reaction to form sodium sulfite and to liberate carbon dioxide, which is used in the first step, (3) reaction of the mixed carbon dioxide and hydrogen sulfide gases from the first step with essentially pure sulfur dioxide in a Claus catalytic reactor to form molten sulfur and a gaseous product consisting primarily of carbon dioxide with a small quantity of sulfur dioxide, which may be returned for use in the first or carbonation step, (4) combustion of the sulfur in a sulfur burner to form sulfur dioxide, (5) absorption and desorption of sulfur dioxide from water to prepare concentrated sulfur dioxide for use in step (3), and (6) absorption of sulfur dioxide in sodium sulfite from step (2) to form sodium bisulfite for use in step (2), and/or for use in pulping. This process has evolved over a period of years, and many alternatives have been suggested.

U.S. Pat. 2,909,407 employs the main steps of the Stora process but also includes the reaction of hydrogen sulfide with sulfur dioxide to form sulfur in the presence of water and the use of heat for coagulation and separation of the sulfur.

The Mead recovery process is characterized by an integration of the recovery furnace and the carbonation system in a continuous adiabatic operation, with utilization of the flue gases from the combustion of the spent liquor for the carbonation of the smelt solution, the combustion of the released hydrogen sulfide in the recovery furnace and the scrubbing of the sulfur dioxide from the combined flue gases with the carbonated solution. The critical carbonation step is carried out in a countercurrent packed tower at elevated temperatures, using a concentrated, clarified smelt solution. The process has been further developed by the inclusion of a precarbonation step, using a portion of the hydrogen sulfide containing off-gases for precarbonation, so as to decrease the volume and increase the concentration of hydrogen sulfide in the gases returned to the recovery furnace. This improved version is described in U.S. Pats. 2,788,273 and 2,849,292 with a modification thereof in U.S. Pat. 3,026,240 wherein precarbonation is performed directly with $SO_2$ free flue gas in parallel with the main carbonation operation instead of in series with it.

The Weyerhaeuser process set forth in U.S. Pat. 3,005,686 describes a sodium sulfite recovery process applicable to the liquors from kraft, neutral sulfite, or acid sulfite pulping. In this process, a smelt solution containing sodium carbonate and sodium sulfide is treated in a first carbon dioxide and hydrogen sulfide absorption stage, followed by a carbonation and hydrogen sulfide stripping stage in successive countercurrent packed towers. The gas used consists principally of nitrogen and carbon dioxide, which is recirculated from a catalytic conversion stage. The hydrogen sulfide, at a concentration of less than six percent in the product gases, is converted to sulfur or sulfur dioxide by catalytic oxidation in the presence of air. The carbonated liquors are treated in a decarbonation stage with sodium bisulfite to liberate carbon dioxide, which is also used in the carbonation step. The sodium bisulfite is produced in a sulfiting tower by reaction of the product liquor from the decarbonation reaction with the sulfur dioxide from a sulfur burner.

Still other methods of carbonation in sodium base pulping liquor recovery processes are described in Paper Trade Journal, vol. 154, isssue 25, pages 39–49 (1970) which is hereby incorporated by reference to further show the state of art.

In both the Mead and Weyerhaeuser processes described above as well as the copending application of Philip E. Shick U.S. Ser. No. 246,367 filed concurrently herewith and in other prior art, gases formed from a pre-carbonation or preabsorption step are vented directly to the atmosphere or if further treatment is desired to an additional absorption tower, a furnace or the like.

SUMMARY OF THE INVENTION

In essence, the present invention involves an improvement on carbonation recovery systems for converting green liquor composed principally of $Na_2S$ and $Na_2CO_3$ to $NaHCO_3$ and $Na_2CO_3$, which may be used in the subsequent preparation of $Na_2SO_3$ the latter of which is adapted for reuse in a pulping liquor. Thus, in a system in which the green liquor is first contacted with a gaseous mixture containing hydrogen sulfide and carbon dioxide in a preabsorption tower, converting the liquor to a mixture of NaHS, $NaHCO_3$ and $Na_2CO_3$, which is then passed through a reaction tower countercurrent to a gas composed principally of carbon dioxide and nitrogen, in which reaction tower the liquor is stripped of $H_2S$, the liquor at the same time being absorptive of $CO_2$ whereby the liquor converts to $NaHCO_3$ and $Na_2CO_3$, most of the hydrogen sulfide in the gases to the precarbonation tower is selectively absorbed in that tower, leaving a gaseous mixture containing nitrogen and carbon dioxide, which is then recycled for use in the reaction tower. By recycling these gases to the reaction tower it is possible to avoid releasing to the atmosphere (or further treating them to remove) any hydrogen sulfide which they may contain. They also serve as an additional source of both nitrogen and carbon dioxide for the carbonation and hydrogen sulfide stripping actions in the reaction tower. Thus it is possible to lead off from the carbonation system a single gas stream emanating from the reaction tower, which stream has a relatively high concentration of hydrogen sulfide suitable for further processing for the recovery of sulfur or sulfur dioxide. The absorption of hydrogen sulfide by the green liquor in the preabsorption tower materially increases the vapor pressure of hydrogen sulfide of the product liquor not only in absolute terms but also relative to the vapor pressure of carbon dioxide over that liquor. This effect is even more marked when the hydrogen sulfide in the gases to the preabsorption tower is preferentially absorbed with a minimum absorption of the carbon dioxide in these gases. Such preferential absorption is favored by limiting the contact time between the liquor and the gas in the preabsorption tower, as by use of sprays or a drip grid packing. In this manner, the hydrogen sulfide vapor pressure of the liquor in the reaction tower may be increased, permitting a higher concentration of hydrogen sulfide in the gas emanating from that tower.

Particular features of novelty are (1) the recycling of gases leaving a precarbonation zone to a main carbonation zone; while (2) operating the precarbonation zone so as to favor selective absorption of hydrogen sulfide in that zone. This eliminates the potential discharge of hydrogen sulfide to the atmosphere from the precarbonation zone; while maintaining the advantage of a precarbonation system in producing a higher concentration of hydrogen sulfide in the gases from the main carbonation zone.

DESCRIPTION OF THE PREFERRED EMBODIMENTS

A pulp is prepared using a chemical charge corresponding to 18% sodium sulfite, 3½% sodium sulfide, 3½% sodium carbonate, and 2½% inerts (sodium sulfate and sodium thiosulfate), all calculated as weight of sodium oxide expressed as percent of oven-dried wood weights. The spent liquor contains approximately 58% inorganic material and 42% organic material and has a gross heat of combustion of approximately 4200–4600 B.t.u. per pound of dry black liquor solids. Spent liquor is removed from the pulp and collected by conventional procedures and is concentrated in multiple effect evaporators to approximately 60% total solids and is then burned in a conventional kraft-type recovery furnace to yield flue gases containing sulfur dioxide and a smelt of approximately the following molar composition:

|  | Percent |
| --- | --- |
| $Na_2S$ | 57 |
| $Na_2CO_3$ | 40 |
| $Na_2SO_4$ | 3 |
| Total | 100 |

For approximately 1000 tons of pulp per day, the recovery furnace flue gases carry approximately 145 mols, or approximately 9300 pounds per hour of $SO_2$. A mol is defined as the molecular formula weight in pounds.

For 1000 tons of pulp per day, approximately 48,000 pounds per hour of smelt is produced. The smelt is dissolved in water to produce a green liquor at a total sodium concentration of approximately 5 normal and is clarified by conventional procedures to give a clarified green liquor, with a composition corresponding to:

|  | Lbs./hr. | Mols/hr. |
| --- | --- | --- |
| $Na_2S$ | 21,400 | 274.2 |
| $Na_2CO_3$ | 21,600 | 203.8 |
| $Na_2S_2O_3$ | 2,400 | 15.2 |
| $Na_2SO_4$ | 2,200 | 15.5 |
| Total | 47,600 | 508.7 |

Figure 2:
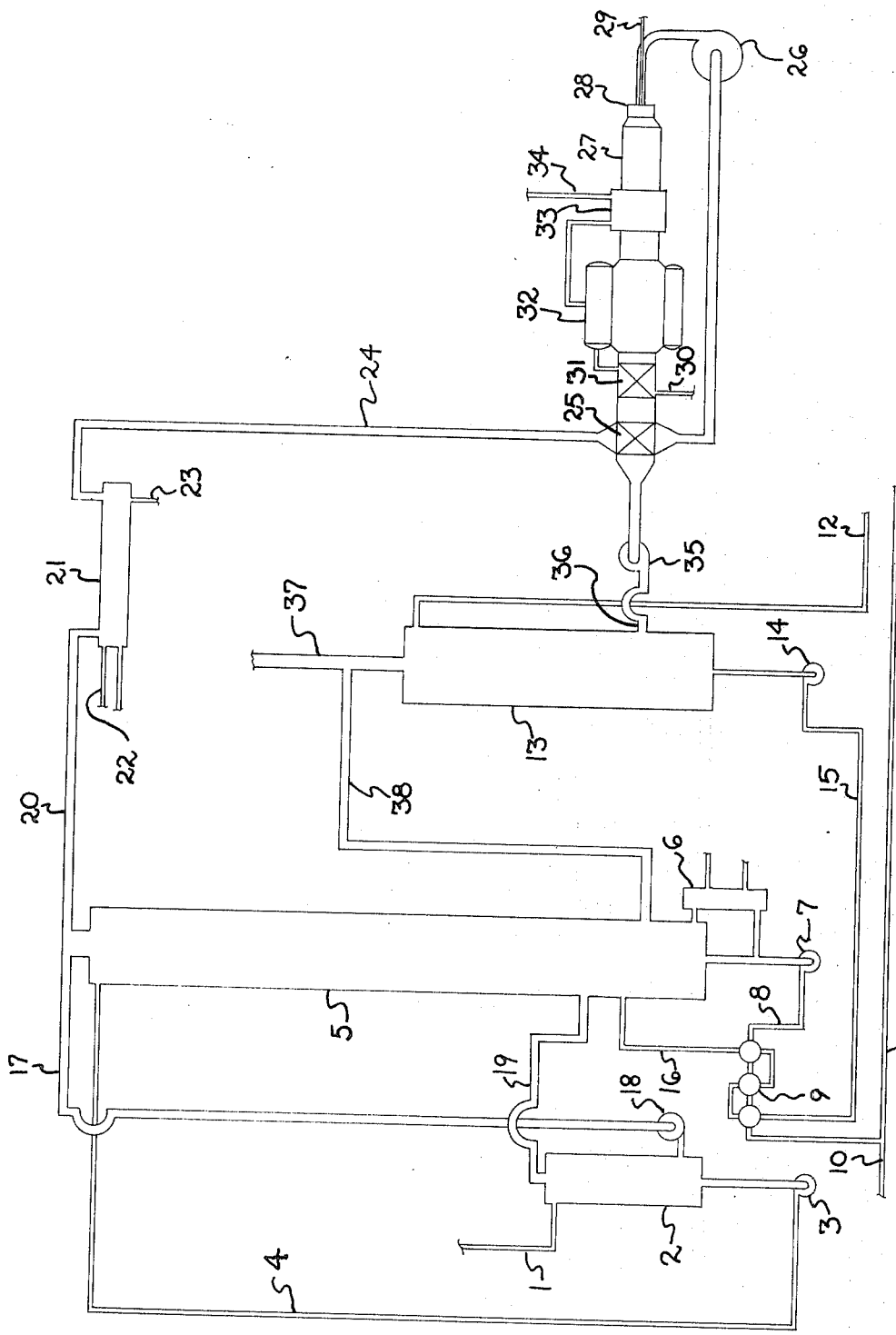
FIG. 2 is simply a more detailed version of the flow pattern shown in FIG.1.

The novel features of my invention used in treating such a liquor are more clearly illustrated in FIG. 2 which covers the further processing of the clarified smelt solution from approximately 1000 tons per day of pulp. Of course, if it is desired to process only a portion of the clarified green liquor, the flows may be correspondingly reduced and adjusted. The clarified green liquor is pumped and metered by conventional means through line 1 at a controlled rate of approximately 400–500 gallons per minute into preabsorption tower 2, in which it is brought into countercurrent contact with gases containing both hydrogen sulfide and carbon dioxide, as drawn by fan 18 through line 17 from the top of the reaction tower 5. The preabsorption tower is desirably filled with an open-type packing, such as a so called "drip-grid" packing or a large dumped ring packing. Expressed in mols per hour, the total chemical content of the green liquor entering the precarbonation tower 2 corresponds to approximately that given above. In addition, the green liquor contains approximately 202,400 pounds of water per hour for a total of approximately 250,000 pounds per hour of green liquor. The liquor from the precarbonation tower 2 at a temperature of approximately 160° F., has an active chemical composition corresponding to the following approximate chemical flow rate:

|  | Mols/hr. |
| --- | --- |
| NaHS | 449 |
| $NaHCO_3$ | 156 |
| $Na_2CO_3$ | 176 |

The liquor from the preabsorption tower 2 is pumped by pump 3 through line 4 to the top of the reaction tower 5, which consists essentially of a bubble plate column of known design, such as are well known in the petroleum industry, with suitable openings and connections for gas and liquids as shown in FIG. 2. As the liquor flows from plate to plate down this column, its sulfide content is stripped off as hydrogen sulfide by the rising gases in the column, while at the same time, it absorbs carbon dioxide from these gases, so that by the time the liquor reaches the lower portion of the column corresponding to the position of the inlet for line 16, it has an active chemical composition corresponding approximately to a chemical rate as follows:

|  | Mols/hr. |
| --- | --- |
| $NaHCO_3$ | 303 |
| $Na_2CO_3$ | 327 |

A liquor carrying approximately 1900–2000 mols of active $Na_2O$ per hour with approximately 50% in the form of sodium sulfite and 50% in the form of sodium bisulfite is introduced through line 16 into column 5 and mixed with the liquor descending from the top of the column. In the lower portion of the column, below the entrance for line 16, these liquors react to give a mixed solution carrying approximately 2400–2500 mols per hour of active $Na_2O$ primarily in the form of sodium sulfite, while the carbonate content of the descending liquor is driven off as carbon dioxide in this decarbonation portion of tower 5.

To promote this decarbonation reaction, the mixed liquors are heated to the boiling point by heat exchange with steam in the heat exchanger 6. The mixed product liquor at approximately 220–240° F. is pumped by pump 7 and line 8 to heat exchanger 9, is passed through the heat exchanger 9 in counter flow to the sulfite-bisulfite liquor, which enters the reaction tower 5 through line 16, in order to conserve heat and to preheat this liquor stream.

A portion of the product liquor corresponding in quantity to the original feed solution is drawn off as a solution primarily of sodium sulfite through line 10 for use in the preparation of fresh cooking liquor for pulping. The major portion of the liquor from the bottom of the reaction tower, after passing through the heat exchanger 9, flows through line 11 to be sulfited. A portion but preferably all, of this liquor is first used to scrub the recovery furnace flue gases to absorb and recover the $SO_2$ content. This is carried out in conventional equipment designed for the scrubbing of such furnace flue gases for the recovery of $SO_2$ and for the elimination of air pollution. These liquors now enriched in $SO_2$ content are returned through line 12 and further sulfited in the bisulfite tower 13 with gases entering through line 36 from the hydrogen sulfide burner 27 to achieve the desired ratio of sodium sulfite to sodium bisulfite for introduction into the reaction tower 5. These liquors are pumped from the bisulfite tower 13 by pump 14 through line 15 through the heat exchanger 9 and through line 16 to the reaction tower 5.

The gases from the top of the reaction tower 5 are split into two streams, at a temperature of approximately 140–160° F., depending upon the pressure at which the tower is operated. One of these streams having approximately the following composition expressed in mols per hour:

|   | Mols/hr. |
|---|---|
| $N_2$ | 1,083 |
| $CO_2$ | 256 |
| $H_2S$ | 173 |
| $O_2$ | 29 |
| $H_2O$ | 513 |
|   | 2,054 | is carried via duct 17 through blower 18 into the preabsorption tower 2. In this tower, essentially all of the hydrogen sulfide and approximately one-half of the carbon dioxide is reabsorbed in the clarified green liquor introduced through line 1. The residual gas from tower 2 is recycled through the reaction tower 5 through duct 19, both to furnish additional carbon dioxide for the carbonation reaction in the reaction tower and to be sure that no hydrogen sulfide is vented to the atmosphere from the preabsorption tower 2. Another portion of the gases from the top of the reaction tower 5, correspond in this example to a flow rate as follows:

|   | Mols/hr. |
|---|---|
| $N_2$ | 1,720 |
| $CO_2$ | 406 |
| $H_2S$ | 274 |
| $O_2$ | 46 |
| $H_2O$ | 815 |
|   | 3,251 | is discharged through duct 20 to the heat exchanger 21, in which the gases are cooled by cooling water introduced at 22. Condensate from the gases is withdrawn through duct 23 and may be discharged to a sewer but preferably is returned to the smelt dissolving system and used in the preparation of the green liquor or may be introduced at any suitable point into the preabsorption tower 2. The cooled gases with a lower moisture content are conducted from the heat exchanger 21 through duct 24 to a preheater 25 which heats them above the dew point to the blower 26, which serves to draw these gases through the reaction tower and cooler and to supply them to the hydrogen sulfide burner 27. Air is drawn into the hydrogen sulfide burner through the openings at 28 and in addition, a pilot flame is maintained using oil or natural gas, introduced through line 29, to assure ignition of the hydrogen sulfide. The pilot burner is also used for preheating the burner and to assure maintenance of sufficient temperature within the burner so that combustion of the hydrogen sulfide will be completed even under upset conditions. Sulfur, sufficient to make up sulfur losses in the pulping and recovery system, may also be introduced into the $H_2S$ burner for combustion to form sulfur dioxide and to give the desired conversions to sulfite in tower 13. Following the burner section 27, the hydrogen sulfide burner gases are cooled and steam is generated from boiler feed water introduced through line 30 through the preheater 31 to the boiler section 32 and through the superheater 33. The steam is withdrawn through line 34. The cooled $H_2S$ burner gases having a composition corresponding approximately to a flow rate of:

|   | Mols/hr. |
|---|---|
| $N_2$ | 3,440 |
| $CO_2$ | 406 |
| $SO_2$ | 274 |
| $O_2$ | 92 |
| $H_2O$ | 709 |
|   | 4,921 | are withdrawn from the burner by fan 35 and discharged through duct 36 into the bisulfite tower 13, where the $SO_2$ is absorbed. The gas flow from the bisulfite tower is splt into two portions, approximately 50–50 in the example and one of these is discharged through duct 37 to the atmosphere, while the other corresponding to a flow of approximately:

|   | Mols/hr. |
|---|---|
| $N_2$ | 1,720 |
| $CO_2$ | 203 |
| $O_2$ | 46 |
| $H_2O$ | 480 |
|   | 2,449 | is introduced through duct 38 into the lower porton of the reaction tower 5. The combined gases from duct 38 and duct 19, with the carbon dioxide liberated in the decarbonation lower section of the reaction tower 5, rise countercurrent to the liquor flow through the reaction tower strip essentially all of the hydrogen sulfide from the descending liquor and lose a portion of their carbon dioxide to the descending liquor to give the liquor and gas compositions indcated.

In summary, the sulfide in the green liquor is converted first into hydrogen sulfide and then into $SO_2$, which is absorbed in a solution of sodium sulfite to form sodium bisulfite, while the active sodium in the green liquor is converted first into a mixture of sodium carbonate and bicarbonate, which is then reacted with the sodium bisulfite to form sodium sulfite.

The steam from line 34 after passing through a turbine for power generation, still contains sufficient heat to supply all of the heat required in the reboiler heat exchanger 6; i.e., corresponding to approximately 40,000 pounds per hour of steam.

It is apparent from the foregoing description that gases can be successfully recycled from a precarbonation tower to a main carbonation tower to eliminate the potential of a spill of hydrogen sulfide from the precarbonation tower into the atmosphere while at the same time maintaining a high concentration of hydrogen sulfide in the gases withdrawn from the main carbonation tower for further processing.

Figure 1:
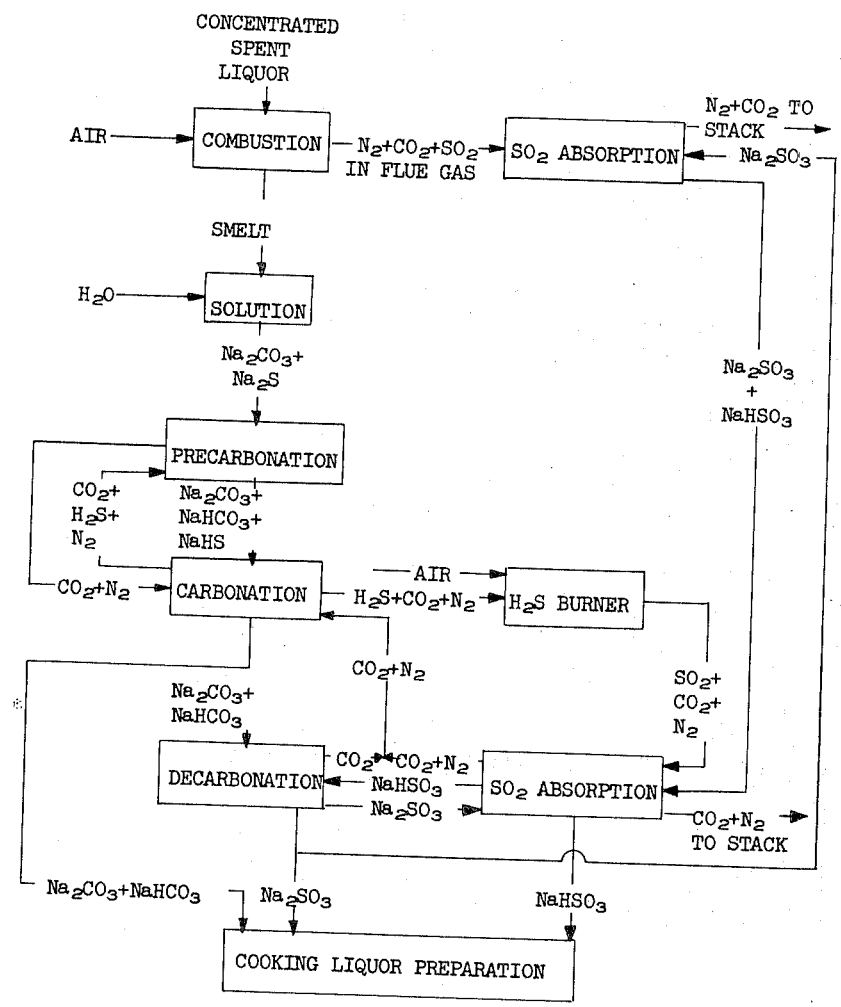
FIG. 1 is a schematic flow sheet showing the general embodiments of one example of the new process as applied to the process described in the copending application of Philip E. Shick, U.S. Ser. No. 246,367, filed concurrently herewith.

Although FIGS. 1 and 2 represent a specific embodiment of the present invention, other arrangements of towers and fans are contemplated for performing the steps of the process set forth in the foregoing specification. For example, the preabsorption tower can be installed on top of the reaction tower or if desired, the reaction tower can be separated into several units run in series to accomplish the same function. The recycling of gases from a preabsorption zone to a main carbonation zone may also be employed in other carbonation recovery systems which utilize other means of generating or conserving the required carbon dioxide and of processing the hydrogen sulfide liberated.

What I claim is:

1. A carbonation system for recovery of chemicals from sodium base pulping, in which hydrogen sulfide is selectively absorbed from gases containing both hydrogen sulfide and carbon dioxide by a green liquor containing principally sodium carbonate and sodium sulfide in an absorption first stage to produce purge gases that are rich in carbon dioxide and a solution containing principally sodium hydrosulfide, sodium bicarbonate and sodium carbonate and the solution is converted in an absorption and desorption second stage to a second solution containing principally sodium bicarbonate and sodium carbonate, and in which the purge gases from the first stage are recycled for use in the second stage.

2. The method of Claim 1 in which the gases for the absorption first stage are obtained from gases produced by the absorption and desorption second stage.

References Cited

UNITED STATES PATENTS

| 3,026,240 | 3/1962 | Matty | 423—209 |
| 2,864,669 | 12/1958 | Ahlborg et al. | 162—36 X |
| 2,644,748 | 7/1953 | Cunningham | 162—36 |
| 3,508,863 | 4/1970 | Kiminki et al. | 162—30 X |
| 2,788,273 | 4/1957 | Shick | 162—36 |

OTHER REFERENCES

Lunden: "Stora-Broby Recovery Process for Semichemical Pulp Mills," Tappi, v. 53, No. 9 (September 1970), pp. 1726–1731.

S. LEON BASHORE, Primary Examiner

A. D'ANDREA, JR., Assistant Examiner

U.S. Cl. X.R.

423—220, 232, 233